United States Patent
Lanagan et al.

(10) Patent No.: US 12,191,082 B2
(45) Date of Patent: Jan. 7, 2025

(54) MATRIX ASSEMBLY HAVING SOLID DIELECTRIC ELEMENTS AND A TAILORED BULK DIELECTRIC CONSTANT AND METHOD OF MANUFACTURING SAME

(71) Applicant: HyQ Research Solutions, LLC, College Station, TX (US)

(72) Inventors: Matthew Lanagan, Louisville, CO (US); Sebastian Rupprecht, College Station, TX (US)

(73) Assignee: HyQ Research Solutions, LLC, College Station, TX (US)

( * ) Notice: Subject to any disclaimer, the term of this patent is extended or adjusted under 35 U.S.C. 154(b) by 287 days.

(21) Appl. No.: 17/362,359

(22) Filed: Jun. 29, 2021

(65) Prior Publication Data
US 2021/0407736 A1  Dec. 30, 2021

Related U.S. Application Data

(60) Provisional application No. 62/705,474, filed on Jun. 29, 2020.

(51) Int. Cl.
*C04B 35/638* (2006.01)
*C04B 35/47* (2006.01)
(Continued)

(52) U.S. Cl.
CPC ........... *H01G 4/1227* (2013.01); *C04B 35/47* (2013.01); *C04B 35/628* (2013.01);
(Continued)

(58) Field of Classification Search
CPC ... C04B 35/78; C04B 35/5436; C04B 35/678; C04B 35/645; C04B 35/638; C04B 35/628; C04B 35/47; H01G 4/1227
See application file for complete search history.

(56) References Cited

U.S. PATENT DOCUMENTS 5,017,872 A   5/1991   Foo et al.
5,154,973 A  10/1992   Imagawa et al.
(Continued)

FOREIGN PATENT DOCUMENTS

EP  3096153 A1  11/2016
WO  2012006416 A2  1/2012
WO  2012006416 A3  1/2012

OTHER PUBLICATIONS

Min et al. "Dielectric Properties of Alumina Ceramics in the Microwave Frequency at High Temperature", Solid State Phenomena, vols. 124-126, published 2007, pp. 743-746 (Year: 2007).*

(Continued)

*Primary Examiner* — Alex B Efta
(74) *Attorney, Agent, or Firm* — Mendelsohn Dunleavy. P.C.; Steve Mendelsohn (57) ABSTRACT

A dielectric assembly solid dielectric elements within a liquid or solid matrix material. The dielectric assembly may be manufactured by pressing a dielectric powder to form pressed dielectric elements, sintering the pressed dielectric elements to form the solid dielectric elements, and assembling the solid dielectric elements within the matrix material to form the dielectric assembly. The solid dielectric elements can be specifically oriented (e.g., in one or more tiled layers) or randomly oriented, and the dielectric assemblies can be molded and/or machined into desired 3D geometries. The dielectric assemblies can be relatively large (e.g., >1 mm$^3$) while having bulk dielectric constants higher than conventional slurries and composites formed of dielectric powder in a liquid or solid matrix.

33 Claims, 5 Drawing Sheets

(51) Int. Cl.
*C04B 35/628* (2006.01)
*C04B 35/645* (2006.01)
*C04B 35/78* (2006.01)
*H01G 4/12* (2006.01)
*B82Y 30/00* (2011.01)
*B82Y 40/00* (2011.01)

(52) U.S. Cl.
CPC .......... *C04B 35/638* (2013.01); *C04B 35/645* (2013.01); *C04B 35/78* (2013.01); *B82Y 30/00* (2013.01); *B82Y 40/00* (2013.01); *C04B 2235/5436* (2013.01)

(56) References Cited

U.S. PATENT DOCUMENTS

| | | | | |
|---|---|---|---|---|
| 5,639,531 | A * | 6/1997 | Chen | C03C 14/002 428/49 |
| 6,544,651 | B2 | 4/2003 | Wong et al. | |
| 8,556,589 | B2 * | 10/2013 | Davis | B29D 99/0025 416/241 B |
| 9,689,941 | B2 | 6/2017 | Zhai et al. | |
| 10,201,313 | B2 | 2/2019 | Rehner | |
| 10,256,551 | B2 | 4/2019 | Shehan | |
| 10,698,044 | B2 | 6/2020 | Kim | |
| 10,976,389 | B2 | 4/2021 | Kim et al. | |
| 2003/0207079 | A1* | 11/2003 | Subramanian | F01D 5/288 428/701 |
| 2004/0214051 | A1* | 10/2004 | Morrison | B28B 21/42 428/701 |
| 2010/0260960 | A1* | 10/2010 | Vance | F23R 3/007 428/44 |
| 2014/0263579 | A1* | 9/2014 | Kulkarni | B23K 1/0018 428/33 |

OTHER PUBLICATIONS

Da Silva et al. "Mineralogical and dielectric properties of mullite and cordierite ceramics produced using wastes", Ceramics International 45(2019) pp. 4692-4699 (Year: 2019).*
U.S. Department of Transportation, "Advisory Circular", Apr. 6, 1992 (Year: 1992).*
Dang, Zhi-Min, et al. "Fundamentals, processes and applications of high-permittivity polymer-matrix composites." Progress in Materials Science 57.4 (2012): 660-723.
Kingery, David W., et al. "Introduction to Ceramics." 2nd edition, John Wiley & Sons (1976): 1-1032.
Liang, Min, et al. "A 3-D Luneburg Lens Antenna Fabricated by Polymer Jetting Rapid Prototyping." IEEE Transactions on Antennas and Propagation 62.4 (2014): 1799-1807.
McGeary, R.K. "Mechanical Packing of Spherical Particles." Journal of the American Ceramic Society 44.10 (1961): 513-522.
Ogitani, Satoshi, et al. "Factors Influencing the Permittivity of Polymer/Ceramic Composites for Embedded Capacitors." IEEE Transactions on Advanced Packaging 23.2 (2000): 313-322.
Sundar, Udhay, et al. "Enhanced dielectric permittivity of optimized surface modified of barium titanate nanocomposites." Polymers 12.4 Article 827 (2020): 1-26.

* cited by examiner

TABLE I

| ID | Description | Composite Bulk $\varepsilon_r$ | Composite Bulk loss | Solid HDC VR | Solid HDC Name | Solid HDC $\varepsilon_r$ | Matrix Component 1 Name | Matrix Component 1 VR C1 | Matrix Component 1 $\varepsilon_r$ | Matrix Component 2 Name | Matrix Component 2 VR C2 | Matrix Component 2 $\varepsilon_r$ |
|---|---|---|---|---|---|---|---|---|---|---|---|---|
| 1.1 | Slurry | 107 | 3.0E-03 | 0% | - | - | water | 60% | 78 | $CaTiO_3$ | 40% | 170 |
| 1.2 | $CaTiO_3$ cylinders in water | 155 | 6.1E-04 | 90% | $CaTiO_3$ | 170 | water | 100% | 78 | - | 0% | - |
| 1.3 | $CaTiO_3$ cylinders in slurry | 161 | 5.7E-04 | 90% | $CaTiO_3$ | 170 | water | 60% | 78 | $CaTiO_3$ | 40% | 170 |
| 1.4 | $BaSrTiO_3$ cylinders in water | 1,837 | 5.3E-03 | 90% | $BaSrTiO_3$ | 4,500 | water | 100% | 78 | - | 0% | - |
| 1.5 | $BaSrTiO_3$ cylinders in slurry | 1,986 | 4.7E-03 | 90% | $BaSrTiO_3$ | 4,500 | water | 60% | 78 | $CaTiO_3$ | 40% | 170 |
| 2.1 | $CaTiO_3$ composite | 12 | 8.8E-03 | 0% | - | - | epoxy | 70% | 4 | $CaTiO_3$ | 30% | 170 |
| 2.2 | $CaTiO_3$ cylinders in epoxy | 75 | 6.5E-04 | 90% | $CaTiO_3$ | 170 | epoxy | 100% | 4 | - | 0% | - |
| 2.3 | $CaTiO_3$ cylinders in epoxy composite | 103 | 6.1E-04 | 90% | $CaTiO_3$ | 170 | epoxy | 70% | 4 | $BaSrTiO_3$ | 30% | 4,500 |
| 3.1 | $BaSrTiO_3$ composite | 33 | 1.8E-02 | 0% | - | - | epoxy | 70% | 4 | $BaSrTiO_3$ | 30% | 4500 |
| 3.2 | $BaSrTiO_3$ cylinders in epoxy | 1,134 | 5.7E-03 | 90% | $BaSrTiO_3$ | 4,500 | epoxy | 100% | 4 | - | 0% | - |
| 3.3 | $BaSrTiO_3$ cylinders in epoxy composite | 1,530 | 5.5E-03 | 90% | $BaSrTiO_3$ | 4,500 | epoxy | 70% | 4 | $BaSrTiO_3$ | 30% | 4,500 |

MATRIX ASSEMBLY HAVING SOLID DIELECTRIC ELEMENTS AND A TAILORED BULK DIELECTRIC CONSTANT AND METHOD OF MANUFACTURING SAME

CROSS-REFERENCE TO RELATED APPLICATIONS

This application claims the benefit of the filing date of U.S. provisional application No. 62/705,474, filed on Jun. 29, 2020, the teachings of which are incorporated herein by reference in their entirety.

BACKGROUND

Field of the Disclosure

The present disclosure relates to composite materials and, more specifically but not exclusively, to composite materials having a tailored dielectric constant.

Description of the Related Art

This section introduces aspects that may help facilitate a better understanding of the disclosure. Accordingly, the statements of this section are to be read in this light and are not to be understood as admissions about what is prior art or what is not prior art.

The dielectric constant (aka relative permittivity) of a material relates to its ability to polarize in an electric field and induce electromagnetic wave propagation. High dielectric constant (HDC) materials (e.g., having a dielectric constant over 30) can be polarized relatively easily by an applied electric field, which effectively creates a smaller electric field within the structure. Another aspect of HDC materials is their ability to induce proportionally higher displacement current in the material, which induces stronger magnetic fields in and outside the material. Another aspect of HDC materials is their ability to shorten the electromagnetic wave within the material under the condition of microwave or radio frequencies, which enhances the electromagnetic wave propagation within and across the surface of the material. HDC materials are typically ceramic oxides such as (without limitation) titanium dioxide ($TiO_2$). Another aspect of HDC materials is their ability to reduce the bulk loss in composites. When HDC materials are exposed to alternating electromagnetic (e.g., RF) fields, the dielectric constant of such materials is a complex number, from which a loss component can be derived using the same mixing rules that apply for dielectric constant. Note that particular values of dielectric constant cited herein correspond to the magnitude of that complex number.

Conventional high-performance ceramics or technical ceramics are solid monolithic pieces fabricated by pressing a ceramic powder within a die using a hydraulic press to increase the powder density. Binders are often used to maintain the structure of the pressed piece. The pressed piece can then be sintered at high temperatures (e.g., 1,000° C.-1,500° C. for 12-48 hours) to drive off the binder and create a solid ceramic piece with even higher density. The fabrication of technical ceramics through sintering has limitations with respect to building electrically continuous, relatively large, three-dimensional structures having a desired geometry. Many large three-dimensional structures require multi-axial loading and pliable dies to create the desired shape. Large solid structures require a large die to apply a large amount of force to bind the powder particles together. Furthermore, maintaining the desired geometric shape is difficult during the sintering process. Thus, the geometry of large, pressed and sintered HDC elements is typically limited to simple shapes such as geometric prisms, disks, or rings.

Composite materials can also be formed by mixing HDC powders, such as SiC, $BaTiO_3$, $CaTiO_3$, $(Ba,Sr)TiO_3$, and $Pb(Mg,Nb)O_3$—$PbTiO_3$, within a matrix material such as water or epoxy that have relatively lower permittivity. These powder-based composites have dielectric properties that are influenced by the individual permittivities and volume fractions of the HDC powders and matrix material in the mixture. These composite materials typically have a much lower volume fraction of HDC material (less than 50%) than a sintered ceramic because of the way the powder particles are packed together. Even in the best-case scenario where the powder particles are pressed together, the volume fraction of HDC material is only about 50% of that of a sintered element. For a composite material to have properties closer to the HDC material constituent, there must be a larger percentage or volume faction of the HDC material within the composite.

The mathematical equations that describe the permittivity of a composite formed by mixing two or more materials are known as "mixing rules." The geometric structure of the composite and the orientation of the electric field to the composite determine whether the constituent materials are in series or parallel or some combination of the two. Depending on this designation, the dielectric properties with respect to the propagation of the electric field in the bulk material can be vastly different. For a case where components or constituents are arranged parallel to the applied electric field, the permittivity of the resulting composite is determined using the "parallel rule" permittivity formula $P_p = P_1 A_1 + P_2 A_2 + \ldots$, where $P_p$ is the permittivity of the parallel composite, $P_1$, $P_2$, etc., are the permittivities of the constituent materials, and $A_1$, $A_2$, etc., are the volume fractions of the constituent materials. For a series arrangement, where the components or constituents are arranged perpendicular to the applied electric field, the permittivity of the resulting composite is determined using the "series rule" permittivity formula $$\frac{1}{P_S} = \frac{A_1}{P_1} + \frac{A_2}{P_2} + \ldots,$$

where $P_s$ is the permittivity of the series composite. Series mixing results in a dramatically lower permittivity than parallel mixing, therefore creating anisotropy in many designs.

Many composites, including ceramic powder mixtures, are some combination of these two different geometries. For a random mixture of series and parallel geometries, the empirical "log rule" permittivity formula is $\log(P_c) = A_1 \log(P_1) + A_2 \log(P_2) + \ldots$, where $P_c$ is the permittivity of the random composite. The resultant permittivity and dielectric loss of the composite is between the values given by the series and parallel mixing rule formulas. See W. David Kingery, Harvey Kent Bowen, and Donald R. Uhlmann, *Introduction to Ceramics*, Vol. 17, 1976 (John Wiley & Sons), the teachings of which are incorporated herein by reference in their entirety.

Some of these prior-art composites with relatively high dielectric constant have relatively high dielectric loss, while others with relatively low dielectric loss have relatively low dielectric constant. For many applications, it would be desirable to provide a relatively large, shaped composite having a relatively high dielectric constant or a tailored dielectric constant with a relatively low dielectric loss.

SUMMARY

Problems in the prior art are addressed in accordance with the principles of the present disclosure by assembling solid dielectric elements within a matrix material to create a composite structure (referred to herein as a "dielectric assembly") with a much higher volume fraction of dielectric material than other composites currently available, thus creating a new class of dielectric composites that can be fabricated into different desirable geometries with dielectric properties close to that of monolithic ceramic materials.

The design of the composite structure utilizes space filling with prefabricated solid dielectric elements of given geometries such that the solid dielectric elements form a three-dimensional structure with an intended geometry. These solid dielectric elements provide a major volume fraction of the dielectric material to produce bulk dielectric properties to the composite structure relatively close to those of the individual solid dielectric elements. In some embodiments, the structure also allows for the bulk permittivity to be (i) anisotropic with respect to the applied electromagnetic field and (ii) spatially variable within the structure according to the design requirement.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
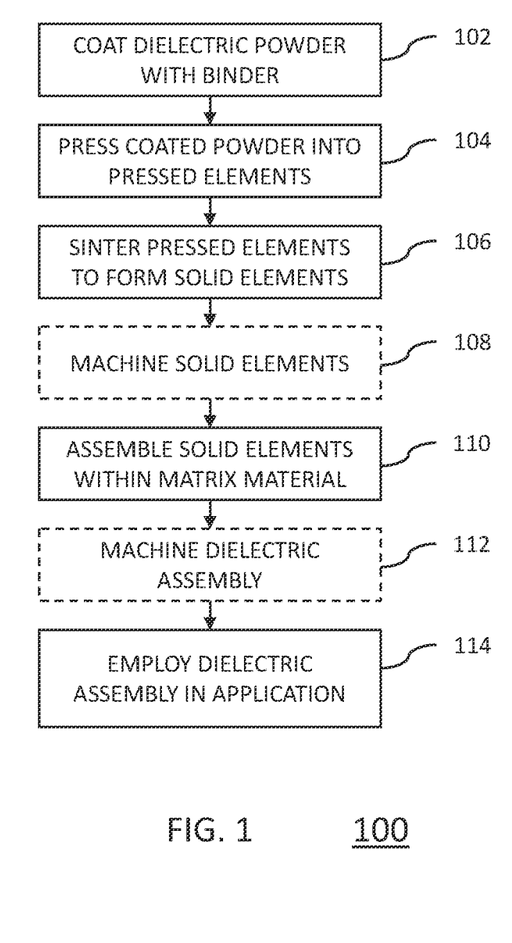
FIG. 1 is a flow diagram of a generic technique for manufacturing dielectric assemblies, according to certain embodiments of the present disclosure.

FIG. 1 is a flow diagram of a generic technique 100 for manufacturing dielectric assemblies, according to certain embodiments of the present disclosure. According to this generic technique, a dielectric powder is coated with a binder (step 102), the coated powder is pressed into individual pressed dielectric elements (step 104), the pressed dielectric elements are sintered to form solid dielectric elements (step 106), the solid dielectric elements are (optionally) machined into desired shapes (step 108), the solid dielectric elements are then assembled within an intervening matrix material (step 110, which involves curing of the matrix material, if appropriate), the resulting dielectric assembly is (optionally) machined into a desired geometry (step 112), and the dielectric assembly is then employed in an application (step 114), such as (without limitation) an RF field application as described below in the context of FIG. 5.

As used herein, the term "solid" as in "solid dielectric elements" is used to refer to elements formed by pressing a dielectric powder to form a pressed dielectric element and then sintering the pressed dielectric element to form a monolithic structure. As such, the term "solid dielectric elements" is synonymous with "pressed and sintered solid dielectric elements" and different from the individual dielectric particles that form a dielectric powder.

Each of the different steps in this generic technique 100 can be implemented in different ways as part of different specific techniques for manufacturing different specific composite material assemblies.

In particular, dielectric powders of different particle size and/or different composition and binders of different composition may be used in step 102. Some specific techniques employ nano- or micro-particle ceramic (e.g., perovskite/inorganic titanate) powders having an average powder particle size from a few nanometers up to about 10 micrometers, such as, without limitation, $SrTiO_3$ (having an intrinsic permittivity of 300), $CaTiO_3$ (having an intrinsic permittivity of 170), $TiO_2$ having an intrinsic permittivity of 95), $BaTiO3$ (having an intrinsic permittivity of 2000), and $BaSrTiO_3$ (having an intrinsic permittivity of 4500), where the powder particles have average sizes less than 0.001 $mm^3$. The binder, which may be any suitable binding agent, such as polyvinyl alcohol, forms a coating on the surface of the individual ceramic powder particles. The purpose of the binder is to hold the ceramic powder particles together in the pressed dielectric elements.

Each pressed dielectric element is formed by loading an amount of the binder-coated dielectric powder into a press die and applying a suitable uniaxial pressure (e.g., greater than 5,000 PSI and typically greater than or equal to 10,000 PSI). The size and shape of the die and the resulting size and shape of the pressed dielectric element will vary for different specific manufacturing techniques, with the pressed dielectric elements being larger than 0.001 $mm^3$ and typically ranging in size from 1 $mm^3$ to as large as $10^5$ $mm^3$ (and possibly larger) and having any suitable shape such as (without limitation) a truncated cylindrical tablet in which the tablet height (e.g., about 5 mm) is smaller than the tablet diameter.

The pressed dielectric element is then heated to drive off the binder and sinter the remaining dielectric material into a solid (i.e., monolithic) dielectric element. In some implementations, the pressed dielectric element is heated to within a first temperature range (e.g., 600° C.-900° C.) for a first period of time to drive off the binder and then heated to within a higher, second temperature range (e.g., 950° C.-1,600° C.) for a second period of time to sinter the dielectric material, where the temperature ranges and periods of time will depend on the particular binding agent and the particular dielectric material.

Depending on the particular implementation, the solid dielectric elements may be machined to alter the element shapes. For example, solid dielectric elements having truncated cylindrical tablet shapes may be machined, e.g., using a machine under CNC (computer numerical control), to form solid dielectric elements having truncated polygonal prism shapes corresponding to regular polygons such as (without limitation) triangles, rectangles, pentagons, and/or hexagons.

Depending on the particular implementation, the solid dielectric elements may be assembled in different geometries in a matrix having different matrix materials. For example, in some implementations, solid dielectric elements of the same or different shapes and/or sizes may be tiled into one or more layers with spacing between adjacent solid dielectric elements within each tiled layer and spacing between adjacent tiled layers with the matrix material filling the intervening volumes. In other implementations, solid dielectric elements may be stacked one top of one another with intervening matrix material between adjacent solid dielectric elements in the resulting stack. In other implementations, the solid dielectric elements may be randomly configured within a container with the matrix material filling the volumes between the randomly oriented, adjacent, solid dielectric elements. In some of these implementations, the matrix material may be a liquid, such as (without limitation) water or alcohol, where the resulting non-solid assembly is contained within a suitable container, such as (without limitation) a sealed plastic bag. In other implementations, the matrix material is an epoxy, a silicone, or other suitable bonding material that is applied as a liquid to fill the intervening volumes and then cured to bond adjacent solid HDC elements together to form the composite material as a solid assembly. In some implementations, the matrix material is a mixture of a bonding material and a dielectric powder. Depending on the particular implementation, the solid dielectric elements and the bonding matrix material may be applied within a mold such that the solid dielectric assembly will have a desired three-dimensional geometry determined by the shape of the mold.

Depending on the particular implementation, the solid dielectric assembly may then be machined, e.g., using a CNC machine, to provide the solid dielectric assembly with a desired three-dimensional geometry.

The resulting dielectric assembly, whether a solid dielectric assembly or a non-solid dielectric assembly within a suitable container, is then employed in a suitable application, such as (without limitation) in an RF application that is enhanced by the bulk dielectric constant of the dielectric assembly, where the bulk dielectric constant is the effective net dielectric constant of the different solid dielectric elements and the intervening matrix material. Those skilled in the art will understand that the bulk dielectric constant and dielectric loss of the assembly will be a function of the volume fraction of the solid dielectric elements with their dielectric constants and the remaining volume fraction of the matrix material with its (typically) different dielectric constant.

For a particular application having a desired bulk dielectric constant, a specific implementation of the generalized technique 100 of FIG. 1 can be designed by selecting at least of the following features:

- The composition and size of the dielectric powder particles, the composition and relative amount of the binder, and the curing temperature profile used to produce the coated dielectric powder in step 102;
- The size and shape of the die, the amount of coated dielectric powder, and the pressure and temperature profile for the pressing in step 104;
- The heating profile for the sintering in step 106;
- If appropriate, the size and shape of the resulting machined solid dielectric elements in step 108;
- The composition of the matrix material, the volume fractions of the solid dielectric elements and matrix material, the configuration of the solid dielectric elements, and, if appropriate, the size and shape of the container or mold used in step 110;
- If appropriate, the size and shape of the resulting machined dielectric assembly in step 112; and
- How to employ the dielectric assembly in the application in step 114.

Figure 2A:
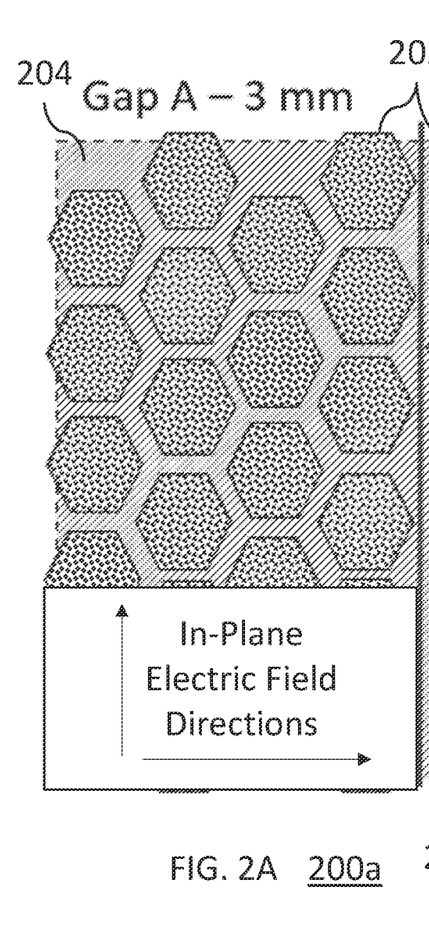
FIG. 2A-2C show three different tiled dielectric assemblies of the disclosure.
Figure 2B:
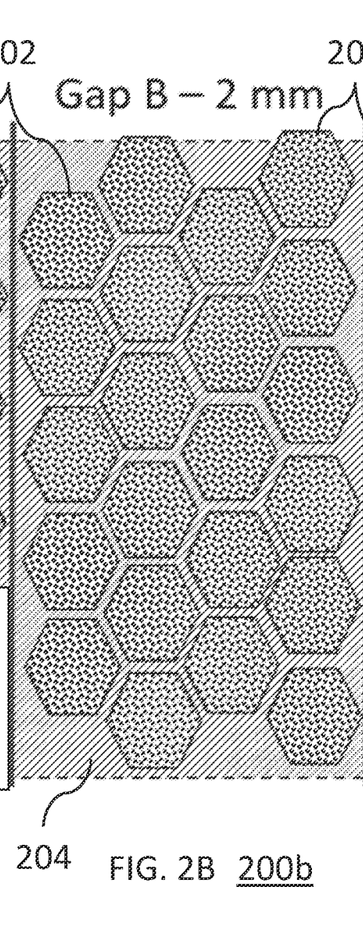
Figure 2C:
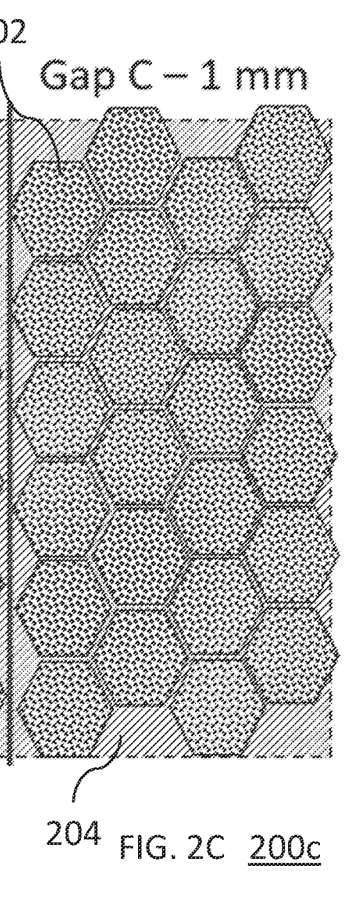

FIG. 2A-2C show three different tiled dielectric assemblies 200a-200c comprising a single layer of hexagonal-prism-shaped solid dielectric elements 202 configured in a hexagonal lattice arrangement in which each interior solid dielectric element 202 is surrounded by six adjacent solid dielectric elements 202, where the three different tiled dielectric assemblies 200a-200c have inter-element spacing of three different spans (e.g., 3 mm, 2 mm, and 1 mm) filled with matrix material 204. The assumed electric field direction (in-plane) for all cases is represented at the bottom of FIG. 2A. Those skilled in the art will understand that, when the dielectric constant of each solid dielectric element 202 is greater than the dielectric constant of the matrix material 204, the tiled dielectric assembly 200a will have the lowest bulk dielectric constant, and the tiled dielectric assembly 200c will have the greatest bulk dielectric constant of the three tiled dielectric assemblies of FIGS. BA-BC.

It will be further understood that, if the desired bulk dielectric constant for a one-layer, tiled dielectric assembly 200, such as shown in FIGS. 2A-2C, is a value between the dielectric constant of each solid dielectric element 202 and the dielectric constant of the matrix material 204 (whichever one is higher), then the gap size can be selected to provide respective volume fractions for the solid dielectric elements 202 and the matrix material 204 that achieve that desired bulk dielectric constant. The matrix span width, the dimensions of the solid dielectric elements, and materials used can also affect the mechanical strength and/or conformity of the tiled dielectric assembly 200. In some embodiments, the thickness of the dielectric assembly is designed to be about ⅛ to ¼ of the wavelength of the electromagnetic radiation that will pass through the assembly during its intended use in order to match impedance on each surface of the tiled dielectric assembly.

Figure 3:
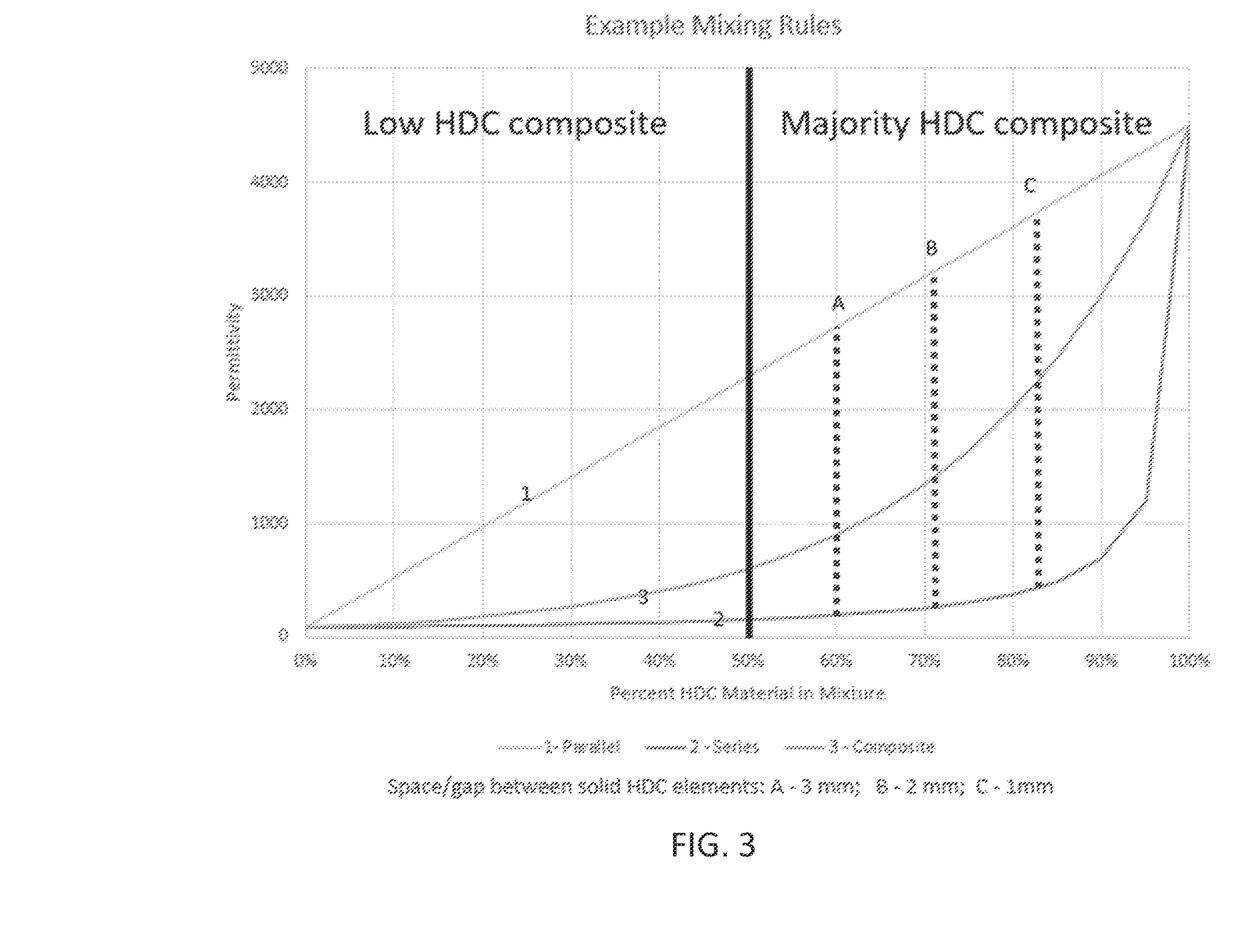
FIG. 3 is a graphical representation of the impact of relative volume fractions on the bulk dielectric constant for dielectric assemblies.

FIG. 3 is a graphical representation of the impact of relative volume fractions on the bulk dielectric constant for dielectric assemblies of solid dielectric elements having a permittivity of 4500 within a matrix material having a permittivity of 80. Curve 1 corresponds to the parallel rule permittivity function that applies to an electric field oscillating in a direction perpendicular to the in-plane directions shown in FIG. 2A of a tiled planar assembly; Curve 2 corresponds to the series rule permittivity function that applies to an electric field oscillating in a direction along the in-plane directions of a tiled planar assembly; and Curve 3 corresponds to the log rule permittivity function which is a combination of the parallel and series rules for an example dielectric assembly. Note that the bulk dielectric constant of a generic dielectric assembly will vary between Curve 1 and Curve 2 depending on the relative angles and magnitudes of the electric fields in the solid dielectric elements and the matrix material of the dielectric assembly. These curves demonstrate how the dielectric assembly can become anisotropic based on the geometrical configuration of the solid dielectric elements as they form an electromagnetically parallel and/or series structure.

As shown in FIG. 3, as the volume fraction of the solid dielectric elements increases from 0% to 100%, the resulting bulk dielectric constant increases from 80 to 4500 along all three Curves A, B, and C. Note that, for the planar arrangements shown in FIGS. 2A-2C, depending on the size of the hexagonal-prism-shaped solid dielectric elements 202, the 60% HDC volume fraction composite (A in FIG. 3) could correspond to the dielectric assembly 200a of FIG. 2A, the 70% HDC volume fraction composite (B in FIG. 3) could correspond to the dielectric assembly 200b of FIG. 2B, and the 80% HDC volume fraction composite (C in FIG. 3) could correspond to the dielectric assembly 200c of FIG. 2C. By adjusting the geometric parameters and/or the permittivity and/or volume fraction of the constituents, dielectric assemblies having a large range of bulk dielectric constant can be achieved.

A conventional prior-art composite in which a dielectric powder is mixed, for example, with water in a liquid slurry composite or with epoxy in a solid composite has a volume fraction of dielectric powder below 50%, which corresponds to the low-dielectric composite range shown in FIG. 3. By using solid dielectric elements instead of a dielectric powder, volume fractions of dielectric material as high as 90% and even higher are achievable, as shown in FIG. 3, which makes much higher bulk dielectric constants possible.

Figure 4:
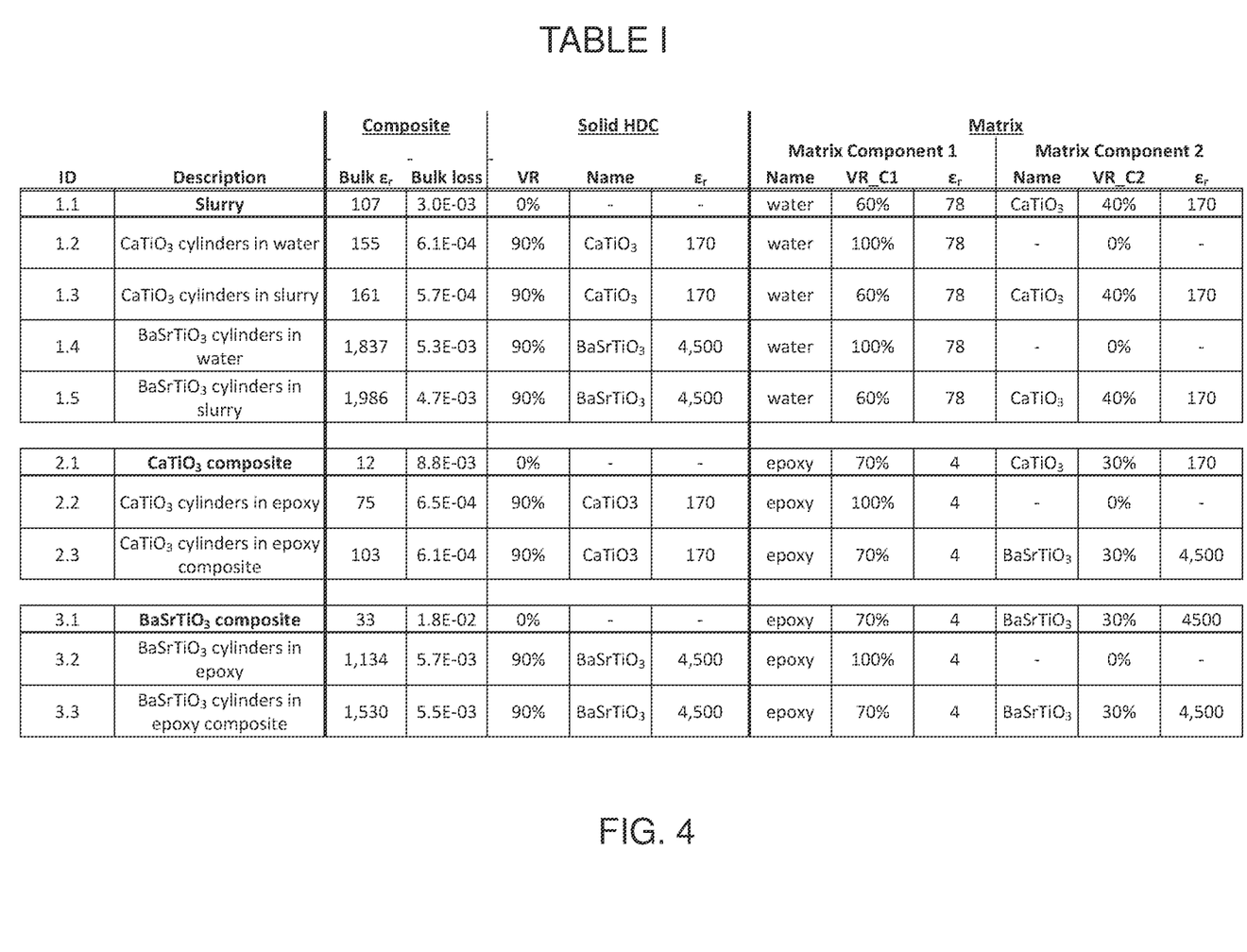
FIG. 4 presents Table I, which enumerates the features of a number of specific dielectric assemblies of the present disclosure compared with the features of a number of corresponding prior-art composites and slurries.

FIG. 4 presents Table I, which enumerates the features of a number of specific dielectric assemblies of the present disclosure (i.e., IDs 1.2-1.5, 2.2, 2.3, 3.2, and 3.3) compared with the features of a number of corresponding prior-art composites (i.e., IDs 1.1, 2.1, and 3.1). For all inventive examples in FIG. 4, the solid dielectric elements are assumed to be cylinders of thickness 2 mm and diameter 7 mm tiled into a hexagonal lattice structure achieving a volume ratio of around 90% of the solid dielectric elements vs. 10% of the matrix material. Two or more such tiled layers can be stacked to fill a volume equivalent to the corresponding prior-art composite example. The electric field is assumed to circulate in plane with the tiled layers. Under this assumption, permittivities are predicted using an empirical rule permittivity formula that is the average of (i) the bulk dielectric constant calculated using the log rule permittivity formula and (ii) the bulk dielectric constant calculated using the series rule permittivity formula. In theory, the electric field could have any orientation, resulting in different bulk dielectric constants based on the dielectric assembly's permittivity anisotropy. The more the shape of the dielectric element deviates from a sphere, the higher the dielectric assembly's permittivity anisotropy.

In particular, prior-art slurry ID 1.1 comprises a 40% volume fraction of $CaTiO_3$ powder having a dielectric constant of 170 in a 60% volume fraction of water having a dielectric constant of 78. The resulting powder/water slurry has a bulk dielectric constant of 107 as determined by the log rule permittivity formula.

The inventive assembly ID 1.2 comprises a 90% volume fraction of solid $CaTiO_3$ cylindrical elements having a dielectric constant of 170 in a matrix in which the matrix material is a 10% volume fraction of water. The resulting cylinder/water assembly has a bulk dielectric constant of 155 as determined by an empirical rule permittivity formula, which is the average of the bulk dielectric constant calculated using the log rule permittivity formula and the bulk dielectric constant calculated using the series rule permittivity formula.

The inventive assembly ID 1.3 comprises a 90% volume fraction of solid $CaTiO_3$ cylindrical elements having a dielectric constant of 170 in a matrix in which the matrix material is a 10% volume fraction of a slurry comprising a 40% volume fraction of $CaTiO_3$ powder in a 60% volume fraction of water. The bulk dielectric constant of the powder/water matrix slurry is 107 as determined using the log rule permittivity formula, and resulting cylinder/powder/water assembly has a bulk dielectric constant of 161 as determined by an empirical rule permittivity formula.

The inventive assembly ID 1.4 comprises a 90% volume fraction of solid $BaSrTiO_3$ cylindrical elements having a dielectric constant of 4500 in a matrix in which the matrix material is a 10% volume fraction of water. The resulting cylinder/water assembly has a bulk dielectric constant of 1837 as determined by an empirical rule permittivity formula.

The inventive assembly ID 1.5 comprises a 90% volume fraction of solid $BaSrTiO_3$ cylindrical elements having a dielectric constant of 4500 in a matrix in which the matrix material is a 10% volume fraction of a slurry comprising a 40% volume fraction of $CaTiO_3$ powder in a 60% volume fraction of water. The bulk dielectric constant of the powder/water matrix slurry is 107 as determined using the log rule permittivity formula, and resulting cylinder/powder/water assembly has a bulk dielectric constant of 1986 as determined by an empirical rule permittivity formula.

The prior-art composite ID 2.1 comprises a 30% volume fraction of $CaTiO_3$ powder having a dielectric constant of 170 encapsulated within a 70% volume fraction of epoxy having a dielectric constant of 4. The resulting powder/epoxy composite has a bulk dielectric constant of 12 as determined by the log rule permittivity formula.

The inventive assembly ID 2.2 comprises a 90% volume fraction of solid $CaTiO_3$ cylindrical elements having a dielectric constant of 170 in a matrix in which the matrix material is a 10% volume fraction of epoxy. The resulting cylinder/epoxy assembly has a bulk dielectric constant of 75 as determined by an empirical rule permittivity formula.

The inventive composite ID 2.3 comprises a 90% volume fraction of solid $CaTiO_3$ cylindrical elements having a dielectric constant of 170 in a matrix in which the matrix material is a 10% volume fraction of a powder/epoxy composite comprising a 30% volume fraction of $CaTiO_3$ powder in a 70% volume fraction of epoxy. The bulk dielectric constant of the powder/epoxy matrix composite is 12 as determined using the log rule permittivity formula, and resulting cylinder/powder/epoxy assembly has a bulk dielectric constant of 103 as determined by an empirical rule permittivity formula.

The prior-art composite ID 3.1 comprises a 30% volume fraction of a $BaSrTiO_3$ powder having a dielectric constant of 4500 encapsulated within a 70% volume fraction of epoxy having a dielectric constant of 4. The resulting powder/epoxy composite has a bulk dielectric constant of 33 as determined by the log rule permittivity formula.

The inventive assembly ID 3.2 comprises a 90% volume fraction of solid $BaSrTiO_3$ cylindrical elements having a dielectric constant of 4500 in a matrix in which the matrix material is a 10% volume fraction of epoxy. The resulting cylinder/epoxy assembly has a bulk dielectric constant of 1134 as determined by an empirical rule permittivity formula.

The inventive assembly ID 3.3 comprises a 90% volume fraction of solid $BaSrTiO_3$ cylindrical elements having a dielectric constant of 4500 in a matrix in which the matrix material is a 10% volume fraction of a powder/epoxy composite comprising a 30% volume fraction of $BaSrTiO_3$ powder in a 70% volume fraction of epoxy. The bulk dielectric constant of the powder/epoxy matrix composite is 33 as determined using the log rule permittivity formula, and resulting cylinder/powder/epoxy assembly has a bulk dielectric constant of 1530 as determined by an empirical rule permittivity formula.

As shown in the examples of FIG. 4, significantly higher bulk dielectric constants can be achieved with matrix assemblies of the solid dielectric elements within a matrix material than with conventional prior-art slurries and composites in which a dielectric powder is mixed with water or epoxy.

As shown in the examples of FIG. 4, in each of the inventive cases, the bulk loss is significantly improved over the prior-art slurries and composites since bulk loss follows the same absolute permittivity formulas. The intrinsic loss in solid ceramics is lower than that of water or epoxy.

Note that the 90%/10% relative volume fractions of the solid cylindrical elements/matrix material in the inventive dielectric assemblies of FIG. 4 were selected merely for purposes of illustration of the general concepts associated with the disclosure. Other dielectric assemblies of the disclosure may have different relative volume fractions, different dielectric materials, and/or different matrix materials.

In general, assemblies of the disclosure have solid dielectric elements within a matrix material, where (i) the solid dielectric elements may be specifically oriented (such as (without limitation) in one or more tiled layers or stacked one on top of the other) or randomly oriented and (ii) the matrix material may be a pure liquid (such as (without limitation) water or alcohol), a slurry (such as (without limitation) ceramic powder in water), a pure solid (such as (without limitation) cured epoxy or silicone), or a composite solid (such as (without limitation) ceramic powder in cured epoxy or silicone).

In some embodiments, the bulk dielectric constant, the dielectric loss, and/or the temperature dependence of the dielectric assemblies can be controlled by purposefully selecting the permittivity of the solid dielectric elements and/or the permittivity of the matrix material. In some embodiments, the bulk dielectric constant will be substantially anisotropic, so that permittivity in any specific direction of the applied electric field will depend on the overall shape of the dielectric assembly and the geometrical arrangement of the solid dielectric elements within the dielectric assembly as well as the constituent permittivities.

Although dielectric assemblies have been described as being formed using solid dielectric elements of the same size and shape, those skilled in the art will understand that dielectric assemblies of the disclosure can also be formed using solid dielectric elements of different sizes and/or different shapes. For example, a flat or curved dielectric assembly can be formed using solid dielectric elements having hexagonal cross-sections and solid dielectric elements having pentagonal cross-sections analogous to the shapes and sizes of elements used to make a soccer ball. In general, the solid dielectric elements can have any suitable 3D shape including (without limitation) regular or irregular polyhedral, (solid or hollow) cylindrical, spheroidal (i.e., spheres, oblates, prolates), geometric prismatic, and even random shapes.

Figure 5:
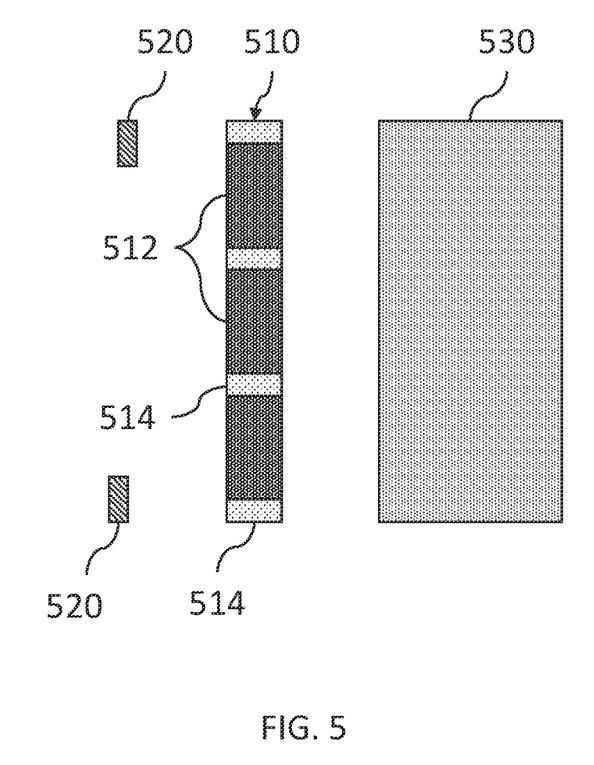
FIG. 5 is a cross-sectional side view of one possible application of a dielectric assembly of the disclosure.

FIG. 5 is a cross-sectional side view of one possible application of a dielectric assembly 510 of the present disclosure. In this example application, the dielectric assembly 510 is a one-layer tiled dielectric assembly comprising solid dielectric elements 512 embedded within a matrix having a solid matrix material 514 filling the interstitial volumes between the solid dielectric elements. As shown in FIG. 5, the dielectric assembly 510 is placed between (i) an RF coil 520 of an RF transmitter or receiver (not shown) of an RF imaging system (e.g., a magnetic resonance imaging (MRI) system) and (ii) the sample 530 being imaged. Note that, in this embodiment, the RF coil 520 has a toroidal shape such that, only the top and bottom portions of the coil are visible in the cross-sectional view of FIG. 5. Those skilled in the art will understand that placing the dielectric assembly 510 between the RF coil 520 and the sample 530 can enhance the sensitivity of the RF imaging system, thereby improving the ability of the RF imaging system to image the sample 530.

Those skilled in the art will understand that there are many other applications for dielectric assemblies of the disclosure, such as (without limitation) radome covers, 5G antennas, and other structural and functional RF communication devices. Radomes comprise dielectric materials with low dielectric loss to minimally attenuate an electromagnetic signal and are of complex shape. The main function of a radome is to protect the antenna from the outside environment. Antennas for telecommunications require a dielectric substrate to structurally support the antenna. In general, dielectric assemblies of the disclosure can be employed in any suitable application where relatively large components having relatively high and/or specific tailored dielectric constant and low dielectric loss values are useful.

Although specific embodiments of dielectric assemblies have been described in which the original dielectric powders are HDC powders, the disclosure covers dielectric assemblies in which the original dielectric powder may have any suitable intrinsic dielectric constant to achieve the desired bulk dielectric constant of the resulting dielectric assembly.

In certain embodiments, the present disclosure is an article of manufacture comprising a dielectric assembly of pressed and sintered solid dielectric elements within a matrix material.

In at least some of the above embodiments, the solid dielectric elements have an element size greater than 0.001 $mm^3$.

In at least some of the above embodiments, the solid dielectric elements have an element size greater than 1 $mm^3$.

In at least some of the above embodiments, the article further comprises RF equipment configured to electromagnetically interact with the dielectric assembly.

In certain embodiments, the present disclosure is a method of manufacturing an article of manufacture comprising a dielectric assembly of solid dielectric elements within a matrix material. The method comprises (a) pressing a dielectric powder to form a plurality of pressed dielectric elements; (b) sintering the pressed dielectric elements to form the solid dielectric elements; and (c) assembling the solid dielectric elements within the matrix material to form the dielectric assembly.

In at least some of the above embodiments, the matrix material physically interconnects the solid dielectric elements to form the dielectric assembly as a solid object.

In at least some of the above embodiments, the matrix material comprises a dielectric powder mixed with a binding material.

In at least some of the above embodiments, step (c) further comprises machining the solid object to form the dielectric assembly.

In at least some of the above embodiments, the matrix material comprises a liquid that fills gaps between the solid dielectric elements.

In at least some of the above embodiments, the dielectric powder has an average particle size less than 0.001 mm$^3$; and the solid dielectric elements have a size greater than 0.001 mm$^3$.

In at least some of the above embodiments, the size of the solid dielectric elements is greater than 1 mm$^3$.

In at least some of the above embodiments, step (c) comprises tiling the solid dielectric elements such that the matrix material fills volumes between the tiled solid dielectric elements.

In at least some of the above embodiments, the dielectric assembly comprises a single layer of tiled solid dielectric elements.

In at least some of the above embodiments, the single layer of tiled solid dielectric elements are assembled to form the dielectric assembly having a non-planar shape.

In at least some of the above embodiments, the dielectric assembly comprises multiple layers of tiled solid dielectric elements.

In at least some of the above embodiments, step (c) comprises (c1) tiling multiple layers of the solid dielectric elements such that the matrix material fills volumes between the solid dielectric elements and (c2) machining the multiple layers of tiled solid dielectric elements to form the dielectric assembly.

In at least some of the above embodiments, the dielectric powder is a ceramic nano-powder coated with a binding agent, and step (a) comprises pressing the dielectric powder within a uniaxial press to form the pressed dielectric elements, wherein the binding agent is driven out of the pressed dielectric elements during step (b).

In at least some of the above embodiments, step (b) comprises (b1) heating the pressed dielectric elements to within a first temperature range to drive out the binding agent and (b2) heating the dielectric elements to within a second temperature range higher than the first temperature range to sinter the dielectric elements.

In at least some of the above embodiments, step (c) comprises (c1) machining the solid dielectric elements to form polygonal-shaped solid dielectric elements and (c2) tiling the polygonal-shaped solid dielectric elements within the matrix material to form the dielectric assembly.

In at least some of the above embodiments, step (c) comprises stacking multiple solid dielectric elements on top of one another with intervening matrix material to form a stack of solid dielectric elements.

In at least some of the above embodiments, step (c) further comprises machining the stack of solid dielectric elements to form the assembly.

In at least some of the above embodiments, the bulk dielectric constant of the dielectric assembly is greater than 10% of the intrinsic dielectric constant of the material of the dielectric powder.

In at least some of the above embodiments, the bulk dielectric constant of the dielectric assembly is greater than 30% of the intrinsic dielectric constant of the material of the dielectric powder.

In at least some of the above embodiments, the bulk dielectric constant of the dielectric assembly is greater than 50% of the intrinsic dielectric constant of the material of the dielectric powder.

In at least some of the above embodiments, the bulk dielectric constant of the dielectric assembly is greater than 70% of the intrinsic dielectric constant of the material of the dielectric powder.

In at least some of the above embodiments, the dielectric assembly comprises a volume fraction of the solid dielectric elements greater than or equal to 50%.

In at least some of the above embodiments, the dielectric assembly comprises a volume fraction of the solid dielectric elements greater than or equal to 70%.

In at least some of the above embodiments, the dielectric assembly comprises a volume fraction of the solid dielectric elements greater than or equal to 90%.

In at least some of the above embodiments, step (c) comprises randomly assembling the solid dielectric elements within the matrix material to form the dielectric assembly.

In at least some of the above embodiments, step (c) further comprises machining the randomly assembled solid dielectric elements to form the dielectric assembly.

In at least some of the above embodiments, the method further comprises selecting a target dielectric constant value and selecting composition of the dielectric powder, composition of the matrix material, and the volume fraction of the solid dielectric elements in the dielectric assembly to achieve a bulk dielectric constant of the dielectric assembly substantially equal to the target dielectric constant value.

In at least some of the above embodiments, the method further comprises selecting sizes and shapes of the solid dielectric elements to achieve the bulk dielectric constant of the dielectric assembly substantially equal to the target dielectric constant value.

In at least some of the above embodiments, the method further comprises selecting dimensions of spacing between the solid dielectric elements filled with the matrix material in the dielectric assembly to achieve the bulk dielectric constant of the dielectric assembly substantially equal to the target dielectric constant value.

In at least some of the above embodiments, the method further comprises placing the dielectric assembly between an RF component and a sample to improve sensitivity of RF detection of the sample using the RF component.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

Although the abbreviation "RF" stands for "radio frequency," as used herein, the term "RF" refers to any suitable communications frequency or frequency band and is not limited to any specific frequency range of the electromagnetic spectrum.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A method of manufacturing an article of manufacture comprising a dielectric assembly of solid dielectric elements within a matrix material, the method comprising:
    (a) pressing the dielectric powder to form a plurality of pressed dielectric elements, wherein the dielectric powder is a ceramic powder coated with a binding agent;
    (b) sintering a pressed dielectric elements to form the solid dielectric elements, wherein the binding agent is driven out of the pressed dielectric elements during step (b); and
    (c) assembling the solid dielectric elements within the matrix material to form the dielectric assembly, wherein step (b) comprises:
        (b1) heating the pressed dielectric elements to within a first temperature range to drive out the binding agent; and
        (b2) heating the dielectric elements to within a second temperature range higher than the first temperature range to sinter the dielectric elements.

2. The method of claim 1, wherein the matrix material physically interconnects the solid dielectric elements to form the dielectric assembly as a solid object.

3. The method of claim 2, wherein the matrix material comprises a dielectric powder mixed with a binding material.

4. The method of claim 2, wherein step (c) further comprises machining the solid object to form the dielectric assembly.

5. The method of claim 1, wherein the matrix material comprises a liquid that fills gaps between the solid dielectric elements.

6. The method of claim 1, wherein:
    the dielectric powder has an average particle size less than 0.001 $mm^3$; and
    the solid dielectric elements have a size greater than 0.001 $mm^3$.

7. The method of claim 6, wherein the size of the solid dielectric elements is greater than 1 $mm^3$.

8. The method of claim 1, wherein step (c) comprises tiling the solid dielectric elements such that the matrix material fills volumes between the tiled solid dielectric elements.

9. The method of claim 8, wherein the dielectric assembly comprises a single layer of tiled solid dielectric elements.

10. The method of claim 9, wherein the single layer of tiled solid dielectric elements are assembled to form the dielectric assembly having a non-planar shape.

11. The method of claim 8, wherein the dielectric assembly comprises multiple layers of tiled solid dielectric elements.

12. The method of claim 11, wherein step (c) comprises:
(c1) tiling multiple layers of the solid dielectric elements such that the matrix material fills volumes between the solid dielectric elements; and
(c2) machining the multiple layers of tiled solid dielectric elements to form the dielectric assembly.

13. The method of claim 1, wherein:
the dielectric powder is a ceramic nano-powder coated with the binding agent; and
step (a) comprises pressing the dielectric powder within a uniaxial press to form the pressed dielectric elements.

14. The method of claim 1, wherein step (c) comprises:
(c1) machining the solid dielectric elements to form polygonal-shaped solid dielectric elements; and
(c2) tiling the polygonal-shaped solid dielectric elements within the matrix material to form the dielectric assembly.

15. The method of claim 1, wherein step (c) comprises stacking multiple solid dielectric elements on top of one another with intervening matrix material to form a stack of solid dielectric elements.

16. The method of claim 15, wherein step (c) further comprises machining the stack of solid dielectric elements to form the assembly.

17. The method of claim 1, wherein the bulk dielectric constant of the dielectric assembly is greater than 10% of an intrinsic dielectric constant of the material of the dielectric powder.

18. The method of claim 17, wherein the bulk dielectric constant of the dielectric assembly is greater than 30% of the intrinsic dielectric constant of the material of the dielectric powder.

19. The method of claim 18, wherein the bulk dielectric constant of the dielectric assembly is greater than 50% of the intrinsic dielectric constant of the material of the dielectric powder.

20. The method of claim 19, wherein the bulk dielectric constant of the dielectric assembly is greater than 70% of the intrinsic dielectric constant of the material of the dielectric powder.

21. The method of claim 1, wherein the dielectric assembly comprises a volume fraction of the solid dielectric elements greater than or equal to 50%.

22. The method of claim 21, wherein the dielectric assembly comprises a volume fraction of the solid dielectric elements greater than or equal to 70%.

23. The method of claim 22, wherein the dielectric assembly comprises a volume fraction of the solid dielectric elements greater than or equal to 90%.

24. The method of claim 1, wherein step (c) comprises randomly assembling the solid dielectric elements within the matrix material to form the dielectric assembly.

25. The method of claim 24, wherein step (c) further comprises machining the randomly assembled solid dielectric elements to form the dielectric assembly.

26. The method of claim 1, further comprising selecting sizes and shapes of the solid dielectric elements to achieve the bulk dielectric constant of the dielectric assembly substantially equal to the target dielectric constant value.

27. The method of claim 26, further comprising selecting dimensions of spacing between the solid dielectric elements filled with the matrix material in the dielectric assembly to achieve the bulk dielectric constant of the dielectric assembly substantially equal to the target dielectric constant value.

28. The method of claim 1, further comprising placing the dielectric assembly between an RF component and a sample to improve sensitivity of RF detection of the sample using the RF component.

29. A method of manufacturing an article of manufacture comprising a dielectric assembly of solid dielectric elements within a matrix material, the method comprising:
(a) pressing a dielectric powder to form a plurality of pressed dielectric elements;
(b) sintering the pressed dielectric elements to form the solid dielectric elements; and
(c) assembling the solid dielectric elements within the matrix material to form the dielectric assembly, wherein:
the dielectric powder is a ceramic nano-powder coated with a binding agent; and
step (a) comprises pressing the dielectric powder within a uniaxial press to form the pressed dielectric elements, wherein the binding agent is driven out of the pressed dielectric elements during step (b).

30. The method of claim 29, wherein step (b) comprises:
(b1) heating the pressed dielectric elements to within a first temperature range to drive out the binding agent; and
(b2) heating the dielectric elements to within a second temperature range higher than the first temperature range to sinter the dielectric elements.

31. A method of manufacturing an article of manufacture comprising a dielectric assembly of solid dielectric elements within a matrix material, the method comprising:
(a) pressing a dielectric powder to form a plurality of pressed dielectric elements;
(b) sintering the pressed dielectric elements to form the solid dielectric elements; and
(c) randomly assembling the solid dielectric elements within the matrix material to form the dielectric assembly.

32. The method of claim 31, wherein step (c) further comprises machining the randomly assembled solid dielectric elements to form the dielectric assembly.

33. The article of manufacture manufactured using the method of claim 31.

* * * * *